US012416933B2

(12) United States Patent
Roh

(10) Patent No.: US 12,416,933 B2
(45) Date of Patent: Sep. 16, 2025

(54) LOW VOLTAGE DROP OUTPUT REGULATOR FOR PREVENTING INRUSH CURRENT AND METHOD FOR CONTROLLING THEREOF

(71) Applicant: MagnaChip Semiconductor, Ltd., Cheongju-si (KR)

(72) Inventor: Gilsung Roh, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 207 days.

(21) Appl. No.: 17/883,886

(22) Filed: Aug. 9, 2022

(65) Prior Publication Data

US 2023/0213955 A1 Jul. 6, 2023

(30) Foreign Application Priority Data

Jan. 3, 2022 (KR) ........................ 10-2022-0000174

(51) Int. Cl.

*G05F 1/575* (2006.01)
*G05F 1/56* (2006.01)
*G05F 1/569* (2006.01)

(52) U.S. Cl.

CPC ................ *G05F 1/575* (2013.01); *G05F 1/56* (2013.01); *G05F 1/569* (2013.01)

(58) Field of Classification Search

CPC ........... G05F 1/575; G05F 1/468; G05F 1/569
See application file for complete search history.

(56) References Cited

U.S. PATENT DOCUMENTS

| | | | | |
|---|---|---|---|---|
| 7,915,959 | B2 * | 3/2011 | Shibata | H03F 3/211 330/277 |
| 8,536,845 | B2 * | 9/2013 | Kim | G05F 1/56 323/276 |
| 2002/0175717 | A1 * | 11/2002 | Ray | H03K 19/018585 327/108 |
| 2010/0090766 | A1 * | 4/2010 | Boucher | H03F 3/45475 330/264 |
| 2013/0169246 | A1 * | 7/2013 | Shao | G05F 1/563 323/266 |
| 2021/0026385 | A1 | 1/2021 | Park et al. | |

* cited by examiner

*Primary Examiner* — Peter M Novak
(74) *Attorney, Agent, or Firm* — NSIP Law

(57) ABSTRACT

A low voltage drop output regulator and a method for controlling thereof for preventing an inrush current that occurs momentarily during an initial operation of a circuit are described. The low voltage drop output regulator includes a differential amplifier configured to output an amplified voltage by comparing a reference voltage with a feedback voltage, a first MOS transistor configured to output an output voltage to a drain terminal by receiving the amplified voltage in a gate terminal, and an inrush preventer connected between a power voltage terminal and a drive node to prevent the inrush current of the first MOS transistor during an initial operation period. The inrush preventer includes a determining unit and a limiter, and the limiter is configured only by a MOS transistor and a switch connected in series between a power voltage terminal and a drive node.

16 Claims, 7 Drawing Sheets

Related Art

Related Art

Related Art

Related Art

LOW VOLTAGE DROP OUTPUT REGULATOR FOR PREVENTING INRUSH CURRENT AND METHOD FOR CONTROLLING THEREOF

CROSS-REFERENCE TO RELATED APPLICATION

This application claims the benefit under 35 U.S.C. § 119 of Korean Patent Application No. 10-2022-0000174 filed on Jan. 3, 2022, in the Korean Intellectual Property Office, the entire disclosure of which is incorporated herein by reference for all purposes.

BACKGROUND

1. Field

The following description relates to a low voltage drop output regulator and a method for controlling thereof.

2. Description of Related Art

A low voltage drop output regulator (LDO regulator) may regulate a high power voltage input from a power supply module of an electronic device to a power source to make it an output voltage with appropriate level inside the device. However, an inrush current (overcurrent) may occur in an initial operation of the LDO regulator. An inrush current may refer to a current that is more than a rated current and may flow momentarily in an initial operation of a circuit, which is high enough to destroy the circuit. Because of the inrush current, the LDO regulator as well as other connected device may be damaged.

FIG. 1 illustrates a circuit diagram of a typical LDO regulator. Referring to FIG. 1, a pass transistor MP0 has the lowest resistance value in an initial operation of the LDO regulator. An inrush current, which is a peak current, may charge the capacitor (Co) of the output terminal through the power output terminal VOUT, and in this case, a circuit may be damaged by the inrush current occurring in the pass transistor MP0.

There is a limit to completely eliminating the inrush current. Therefore, in order to protect a circuit, various methods are suggested to prevent or minimize the inrush current.

FIG. 2 illustrates a block diagram of a typical low voltage drop output regulator to prevent the inrush current. Compared with FIG. 1, the low voltage drop output regulator of FIG. 2 has an inrush preventer. The inrush preventer is connected in parallel between the amplifier AMP and a gate terminal of the pass transistor MP0, so that it may output a regulated and amplified voltage to the gate terminal of the pass transistor MP0, according to separated control signals.

As illustrated in FIG. 2, the typical inrush preventer may include a determining unit and a limiter. The determining unit may control an operation of the limiter by outputting an enable signal EN based on control signals. The limiter may control the amplified voltage (VG) of the gate terminal of the pass transistor MP0 by turning on or turning off according to the enable signal EN of the determining unit. The inrush preventer may be turned on by the enable signal EN during an initial operation period of the LDO regulator. The inrush current, which is an overcurrent, may be prevented by adding the inrush preventer.

FIG. 3 illustrates a practical block diagram of the limiter illustrated in FIG. 2. Specifically, FIG. 3 illustrates an inner circuit block diagram of the limiter illustrated in FIG. 2, and as shown in FIG. 3, the limiter comprises 3 transistors (M1 to M3), 3 switches (SW1 to SW3), and 2 resistors (R3, R4) that are connected to each other. As further illustrated in FIG. 3, transistors M1 and M3 may be PMOS transistors, and transistor M2 may be an NMOS transistor.

However, since the limiter illustrated in FIG. 3 requires a large number of transistors, switches, and resistors, the design area of the LDO regulator circuit is limited. As is known to those skilled in the art, as the size of the circuit increases, various devices implementing the circuit may also increase, making it difficult to reduce the size of the product, thereby increasing the manufacturing cost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a low voltage drop output regulator includes a differential amplifier configured to output an amplified voltage by comparing a reference voltage with a feedback voltage; a first MOS transistor configured to output an output voltage to a drain terminal by receiving the amplified voltage in a gate terminal; and an inrush preventer connected between a power voltage terminal and a drive node, which is an output terminal of the differential amplifier, and configured to prevent an inrush current of the first MOS transistor during an initial operation period, wherein the inrush preventer comprises a second MOS transistor and a switch connected in series between the power voltage terminal and the drive node and, is connected with the gate terminal of the first MOS transistor.

The switch may be connected between the power voltage terminal and the second MOS transistor.

The second MOS transistor may be connected between the switch and the drive node.

The second MOS transistor may be connected between the power voltage terminal and the switch.

The switch may be connected between the second MOS transistor and the drive node.

The inrush preventer may include a determining unit to output a switch-on signal according to control signals; and a limiter configured to control the amplified voltage provided to the gate terminal of the first MOS transistor by turning on or turning off according to the switch-on signal.

The inrush preventer is configured to keep a voltage level of the drive node higher than 0V (Zero voltage).

The initial operation period may refer to a time from which the switch maintains a turned-on state until it is turned off.

The differential amplifier may include a third MOS transistor and a fourth MOS transistor connected in series between the power voltage terminal and a ground terminal, wherein the second MOS transistor charges an amount of current flowing through the fourth MOS transistor during the initial operation period.

The first to third MOS transistors may be P-type, and the fourth MOS transistor may be N-type.

The low voltage drop output regulator of the one or more examples may further include a plurality of distribution resistors connected between the drain terminal and the ground terminal to generate the feedback voltage; and an output capacitor connected to the drain terminal, which is an output terminal of the first MOS transistor.

In another general aspect, a low voltage drop output regulator includes a differential amplifier configured to compare a reference voltage with a feedback voltage; a pass transistor connected to an output terminal of the differential amplifier; and a transistor and a switch for preventing an inrush current of the pass transistor that are connected in parallel to a gate terminal of the pass transistor, wherein a node between an output terminal of the differential amplifier and the gate terminal of the pass transistor maintains a certain level of voltage while the switch is being turned on.

The transistor for preventing the inrush current of the pass transistor may compensate an amount of current from a power voltage terminal as much as a flowing amount into a ground terminal through the differential amplifier.

The certain level of voltage may be higher than 0V.

The switch may be turned on during an initial operation period of the low voltage drop output regulator, and the switch may be turned off in a normal operation of the low voltage drop output regulator.

In a general aspect, a method for controlling a low voltage drop output regulator includes applying an amplifier (AMP) enable signal for operating a differential amplifier while a switch is being turned on that is connected in series between a power voltage terminal and a drive node connected to a gate terminal of a first MOS transistor; increasing an output voltage during an initial operation period of the low voltage drop output regulator by the AMP enable signal; and maintaining a voltage level of the drive node higher than 0V during the initial operation period by a second MOS transistor connected in series to the switch.

The differential amplifier may include a third MOS transistor and a fourth MOS transistor connected in series between the power voltage terminal and a ground terminal, and may charge the drive node through the second MOS transistor as much as a flowing amount through the fourth MOS transistor during the initial operation period.

The initial operation period may be completed when the switch is turned off.

While the switch is being turned on, the fourth MOS transistor may decrease a drive voltage of the drive node below a certain voltage.

The certain voltage may be a difference between a voltage level of the power voltage terminal and a turned-on voltage of the second MOS transistor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
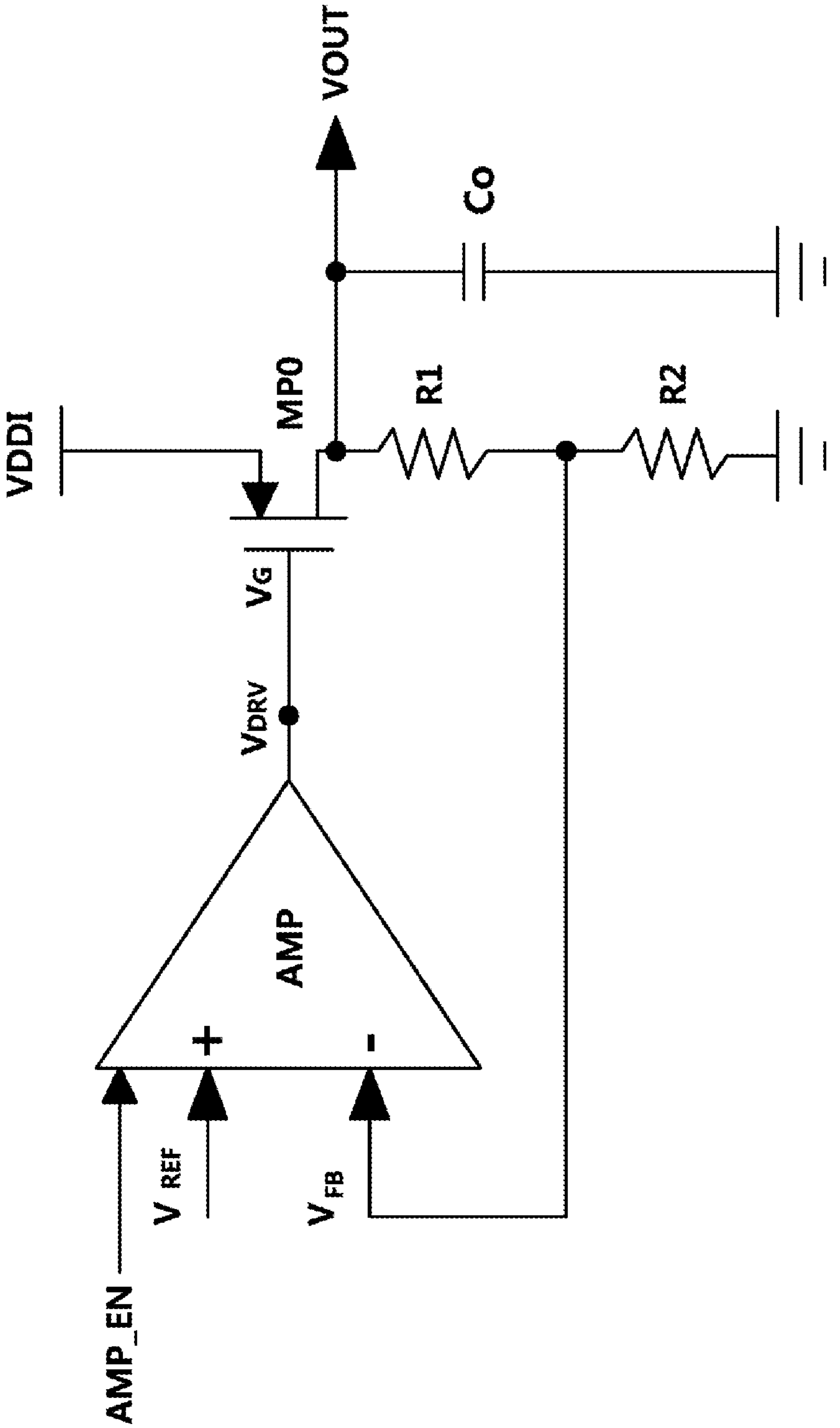
FIG. 1 illustrates a circuit diagram of a typical low voltage drop output regulator.
Figure 2:
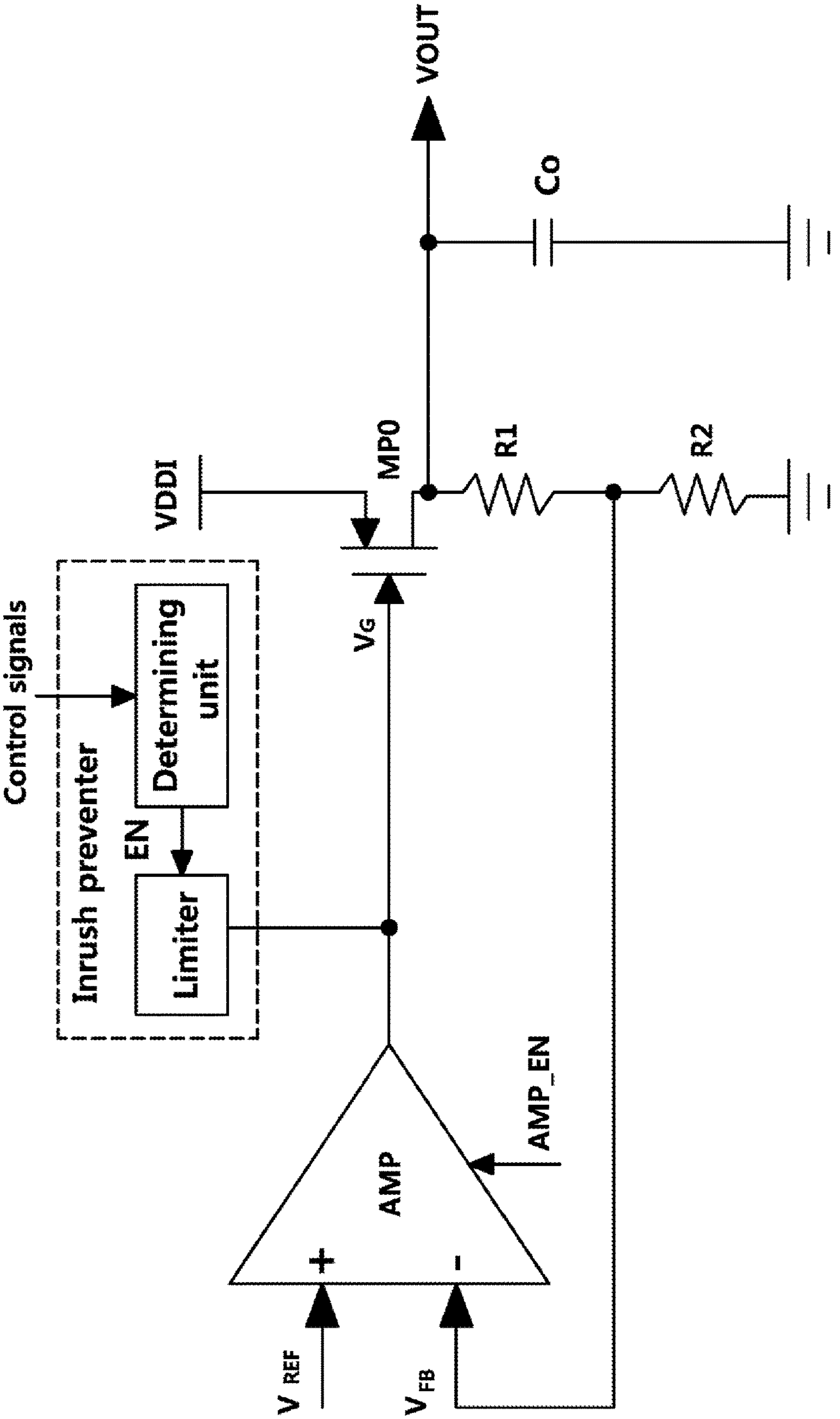
FIG. 2 illustrates a block diagram of a typical low voltage drop output regulator to prevent an inrush current.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening there between. In contrast, when an element is described as being "directly on," "directly connected to," or "directly coupled to" another element, there can be no other elements intervening there between.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The one or more examples may solve problems related to the above technical issue. By simplifying a circuit configuration with preventing an inrush current as typical and reducing a design area, the one or more examples may provide a low voltage drop output regulator for preventing an inrush current.

The one or more examples may provide a controlling method to prevent an inrush current during an initial operation period of a low voltage drop output regulator with more simple circuit configuration compared with a typical case.

A detailed description is given below, with attached drawings.

Figure 4:
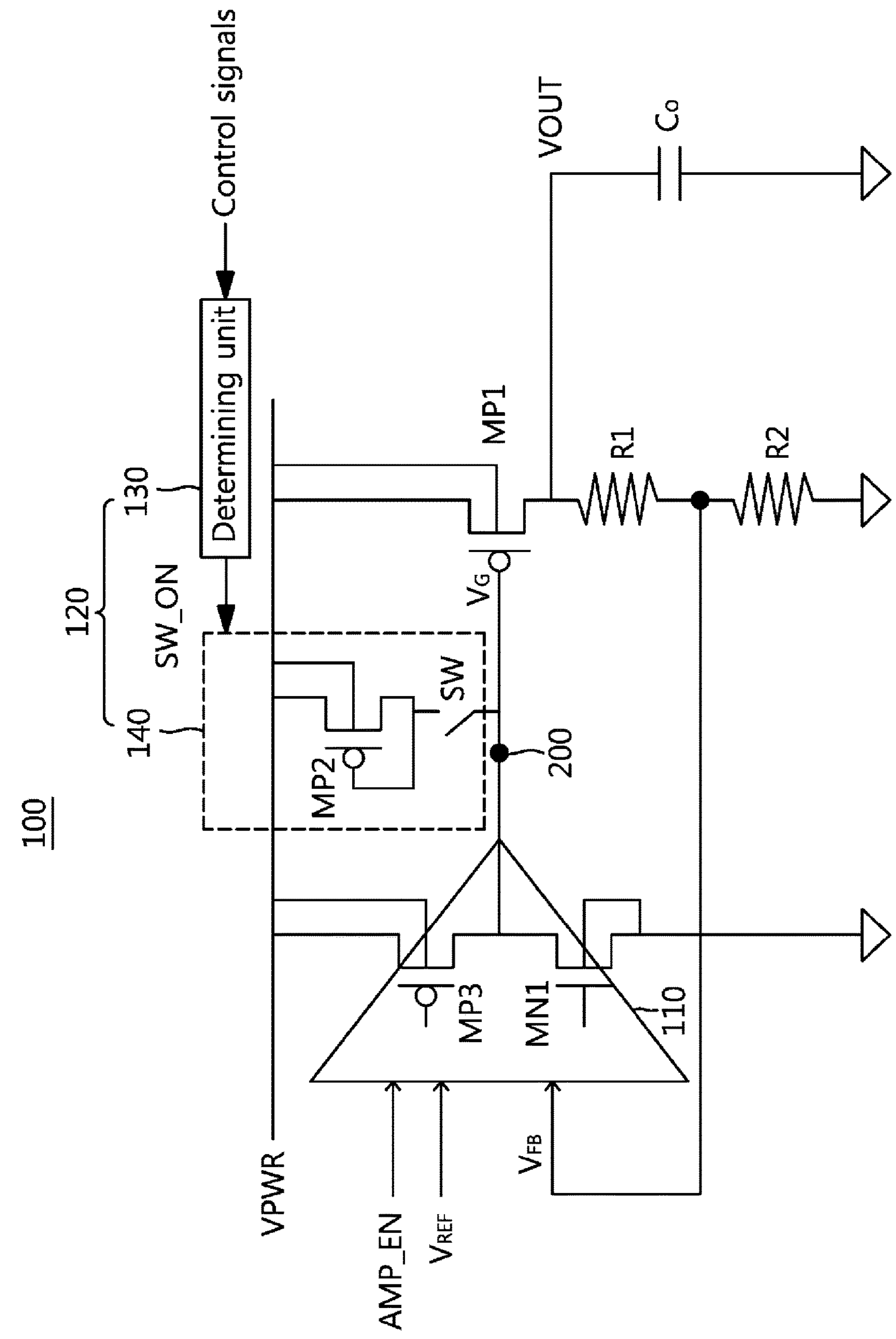
FIG. 4 illustrates a block diagram of a low voltage drop output regulator in accordance with one or more embodiments of the disclosure.

FIG. 4 illustrates an example block circuit diagram of a low voltage drop output regulator 100 in accordance with one or more embodiments.

Referring to FIG. 4, the low voltage drop output regulator 100 may include a differential amplifier 110, an inrush preventer 120, a first MOS transistor MP1, distribution resistors R1, R2, and an output capacitor (Co). The first MOS transistor MP1 may be a pass transistor.

The differential amplifier 110 may be operated by an AMP enable signal (AMP_EN), receive, compare a reference voltage ($V_{REF}$) with a feedback voltage ($V_{FB}$), and output an amplified voltage (VG) to a gate terminal of the first MOS transistor MP1. The differential amplifier 110 may be configured by a third MOS transistor MP3 and a fourth MOS transistor MN1. A source terminal of the third MOS transistor MP3 may be connected to a power voltage terminal VPWR, and a source terminal of the fourth MOS transistor MN1 may be connected to a ground terminal.

The inrush preventer 120 may be connected in parallel between the differential amplifier 110 and a gate terminal of the first MOS transistor MP1. According to separated control signals, the inrush preventer 120 may output an adjusted amplified voltage to a gate terminal of the first MOS transistor MP1. The control signals may be configured by a feedback signal generated based on an output voltage VOUT or may be configured by being supplied from an internal logic or external device. The control signals may include a plurality of signals set by a predetermined value for an estimated inrush current and voltage. A configuration of the inrush preventer 120 of the disclosure will be described below in detail.

The first MOS transistor MP1 may receive the amplified voltage ($V_G$) from the differential amplifier 110 through a gate terminal. A source terminal may be connected to the power voltage terminal VPWR and receive a power input voltage. A drain terminal may output an output voltage VOUT.

Distribution resistors R1, R2 and an output capacitor (Co) may be connected in parallel to an output terminal of the low voltage drop output regulator 100. The distribution resistors R1, R2 may be connected in series to a drain terminal of the first MOS transistor MP1, distribute an output voltage of the low voltage drop output regulator 100, and supply it to the feedback voltage ($V_{FB}$) of the differential amplifier 110.

The inrush preventer 120 of the disclosure may play a role to prevent a node (that is, a drive node 200) between the differential amplifier 110 and a gate terminal of the first MOS transistor MP1 from being 0V (zero). Therefore, in an initial operation of the low voltage drop output regulator 100, by preventing an operation of the drive node 200 with 0V, an inrush current may not be generated in the first MOS transistor MP1.

The inrush preventer 120 may include a determining unit 130 and a limiter 140. The determining unit 130 may control an operation of the limiter 140 by outputting a switch-on signal (SW_ON) based on control signals. The limiter 140 may be turned on or turned off according to the switch-on signal (SW_ON) of the determining unit 130, and through that, the limiter 140 may control the amplified voltage ($V_G$) of a gate terminal of the first MOS transistor MP1. According to one or more examples, the determining unit 130 may output the switch-on signal (SW_ON) with a low level according to control signals generated by the output voltage's VOUT reaching a predetermined voltage level. Accordingly, a switch SW may be turned off.

Referring to FIG. 4, the limiter 140 may be configured by the second MOS transistor MP2 and the switch SW only connected in series between the power voltage terminal VPWR and the driver node 200. The second MOS transistor MP2 may be operated in connection with the fourth MOS transistor MN1 of the differential amplifier 110. That is, the second MOS transistor MP2 may compensate a current value flowing through the fourth MOS transistor MN1. According to the compensating operation, the driver node 200 may always maintain a certain level of voltage during the initial operation period of a circuit, without being 0V.

The switch SW in the inrush preventer 120 may be connected between the second MOS transistor MP2 and the driver node 200, or between the power voltage terminal VPWR and the second MOS transistor MP2. The switch SW is not limited to a certain configuration, as long as the configuration may supply a current to the drive node 200 by maintaining a turned-on state during the initial operation period of the LDO regulator 100. The switch SW may be turned on during the initial operation period of the LDO regulator 100 of the disclosure, and in a normal operation (that is, after the initial operation period), the switch may be turned off.

With the configurations, in the disclosure, when the low voltage drop output regulator 100 is operated with the second MOS transistor MP2 and the switch SW connected between the power voltage terminal VPWR and the driver node 200, the fourth MOS transistor MN1 may decrease a voltage of the driver node 200 below a certain voltage. Then, the second MOS transistor MP2 may be turned on, and a voltage distributed by the second MOS transistor MP2 and the fourth MOS transistor MN1 may be applied to the drive node 200. Therefore, the drive node 200 may maintain a certain level of voltage, preventing the drive node 200 from being 0V. Consequentially, during the initial operation period of the low voltage drop output regulator 100, it may be possible to prevent an overcurrent (inrush current) from being generated momentarily in the first MOS transistor MP1, and an operation of the first MOS transistor MP1, which is a basic operation of the low voltage drop output regulator 100, may not be interrupted.

In one or more examples, the above-mentioned first to third MOS transistors (MP1~MP3) may be PMOS transistors, and the fourth MOS transistor MN1 may be an NMOS transistor.

One or more examples of the disclosure to prevent an inrush current will be described in detail with an operation timing diagram below.

Figure 5:
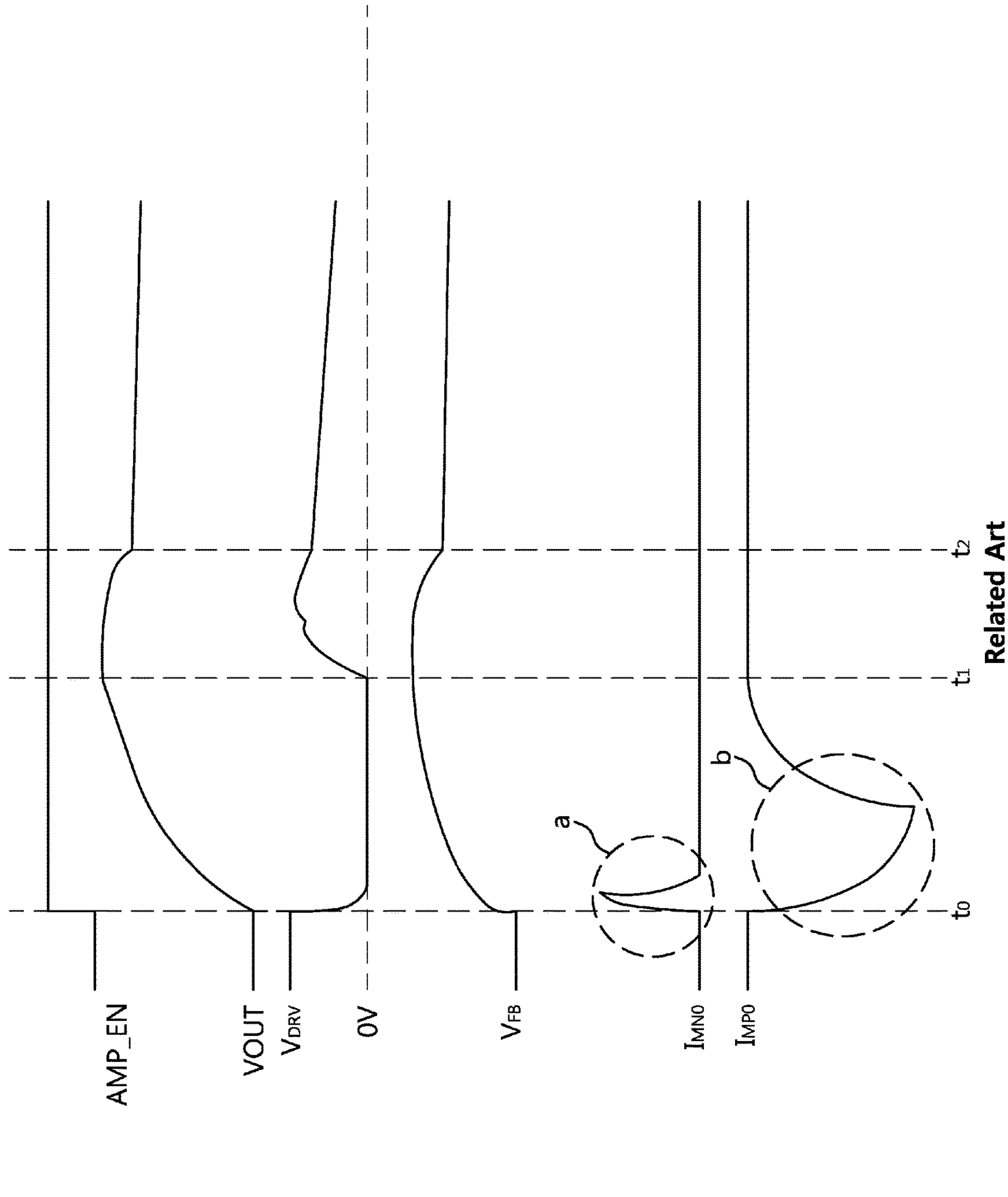
FIG. 5 illustrates an operation timing diagram of the typical low voltage drop output regulator illustrated in FIG. 1.
Figure 6:
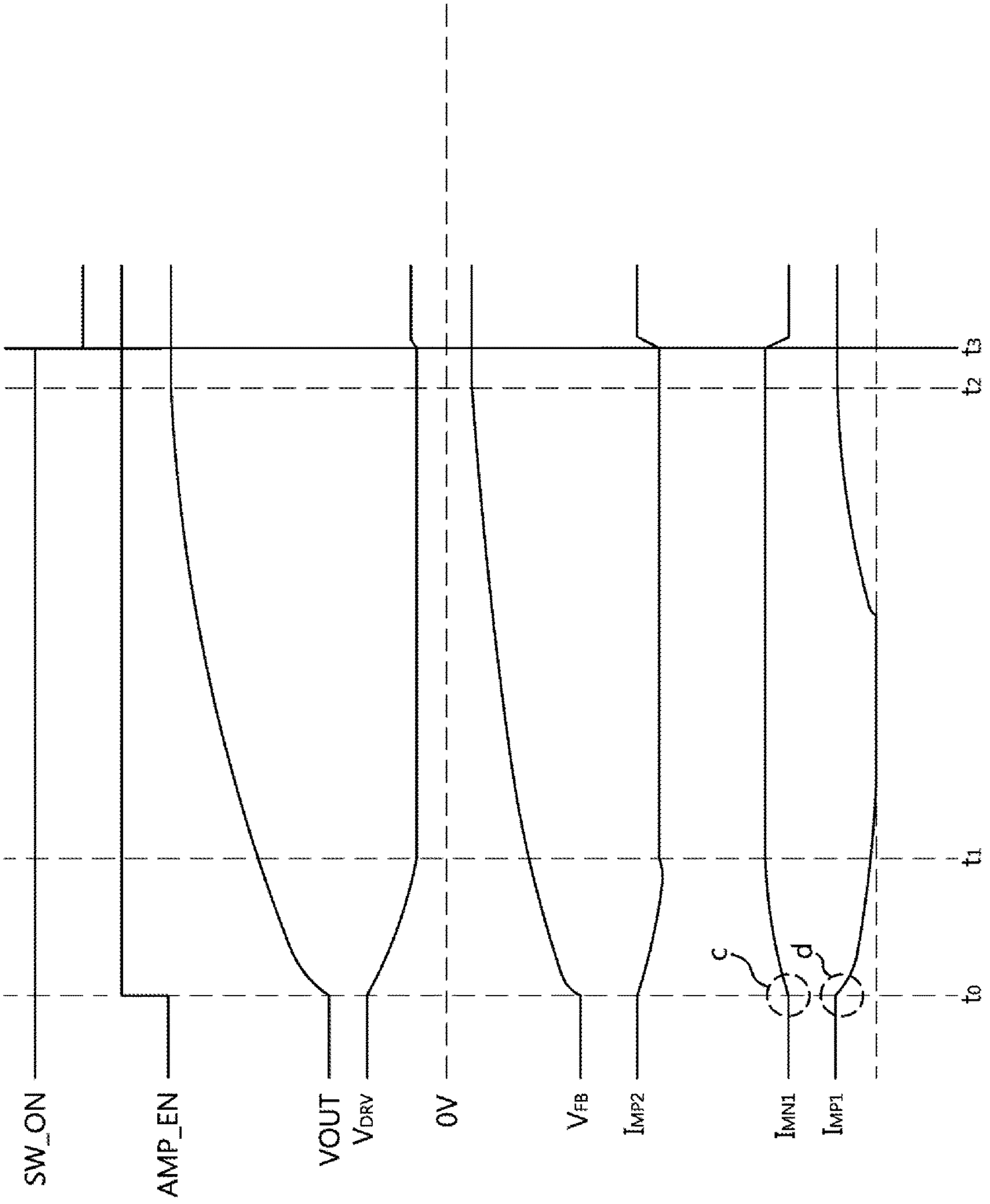
FIG. 6 illustrates an operation timing diagram of the disclosure illustrated in FIG. 4.

FIG. 5 and FIG. 6 illustrate operation timing diagrams for a typical circuit and an example circuit of the disclosure, respectively. Specifically, the operation timing diagram of FIG. 5 is for a typical LDO regulator circuit illustrated in FIG. 1.

Referring to the operation timing diagram of FIG. 5, in order to operate the LDO regulator, an AMP enable signal (AMP_EN) becomes high level from low level ($t_0$). Then, until $t_1$ from $t_0$, the output voltage VOUT may increase in a certain section and maintain a certain level after $t_2$. In this case, the feedback voltage ($V_{FB}$) initially increases with a similar wave of the output voltage VOUT and may maintain a certain level after increasing.

In a circuit of FIG. 1, an output capacitor (Co) equipped in an output terminal may use a capacitor having relatively large capacity to supply an output voltage stably. Therefore, an output node may be operated very slowly, but a drive node in an output terminal of the amplifier may be operated relatively faster than the output node. Accordingly, a drive voltage ($V_{DRV}$) of the drive node may be 0V momentarily from $t_0$ to $t_1$. A section where the drive voltage ($V_{DRV}$) is 0V is $t_0$~$t_1$, which starts from when the AMP enable signal (AMP_EN) becomes high level and then ends with when the output voltage VOUT starts to decrease after increasing.

During the $t_0$~$t_1$, an inrush current may be generated in a transistor (MN0; not shown in FIG. 1) configured in the amplifier of FIG. 1 and a pass transistor MP0. As illustrated in FIG. 5, the inrush current ($I_{MN0}$, 'a') flowing into the MN0 is considerably smaller than the inrush current ($I_{MP0}$, 'b') flowing into the pass transistor MP0. Therefore, the $I_{MN0}$ may be ignored because it does not have a significant impact on operating a circuit. However, the inrush current ($I_{MP0}$) flowing into the pass transistor MP0 is momentarily generated, and the value is considerably large. The one or more examples may minimize the inrush current ($I_{MP0}$) flowing into the pass transistor MP0.

An operation of the one or more examples is described with referring to FIG. 6. Compared with the operation timing diagram of FIG. 5, timing diagrams of the switch-on signal (SW_ON) and a current $I_{MP2}$ of the second MOS transistor MP2 to prevent an inrush current are further added.

In the one or more examples, the second MOS transistor MP2 and the switch SW may be connected in series between the power voltage terminal VPWR and the drive node 200. The switch SW may maintain a turned-on state during the initial operation period of the LDO regulator according to the switch-on signal (SW_ON).

While the switch SW is being turned on, the output voltage VOUT may start to increase when the AMP enable signal (AMP_EN) becomes high level from low level at $t_0$. When the output voltage VOUT increases, the feedback voltage ($V_{FB}$) may increase in proportion to the output voltage. Additionally, while the switch SW is being turned on, the fourth MOS transistor MN1 may decrease the drive voltage ($V_{DRV}$) of the drive node 200 below a certain voltage. That is, the voltage of the drive node 200 may decrease below a voltage (for example, VPWR-Vthp) obtained by subtracting a turn-on voltage (threshold voltage, Vthp) of the second MOS transistor MP2 from the power voltage terminal VPWR. Therefore, the voltage ($V_{DRV}$) of the drive node 200 may decrease gradually from $t_0$ to $t_1$.

In this example, the second MOS transistor MP2 may be turned on by the drive voltage ($V_{DRV}$). Accordingly, a distributed voltage divided by the second MOS transistor MP2 and the fourth MOS transistor MN1 starts to be applied to the drive node 200 from $t_0$ to $t_1$, and through that, the drive node 200 may maintain a certain voltage. That is, the second MOS transistor MP2 may compensate a current as much as an amount of current flowing through the fourth MOS transistor MN1, and the drive node 200 may maintain a certain voltage higher than 0V accordingly.

Therefore, when looking at currents $I_{MN1}$ and $I_{MP1}$ flowing into the fourth MOS transistor MN1 as well as the first MOS transistor MP1, an inrush current does not occur ('c' and 'd' of FIG. 6) in the operation timing diagram of FIG. 6.

Similarly, the one or more examples may prevent an inrush current in a low voltage drop output regulator. As mentioned above, the limiter 140 preventing an inrush current has only 1 transistor and 1 switch. There is a big difference compared to the typical circuit configuration as shown below.

Figure 3:
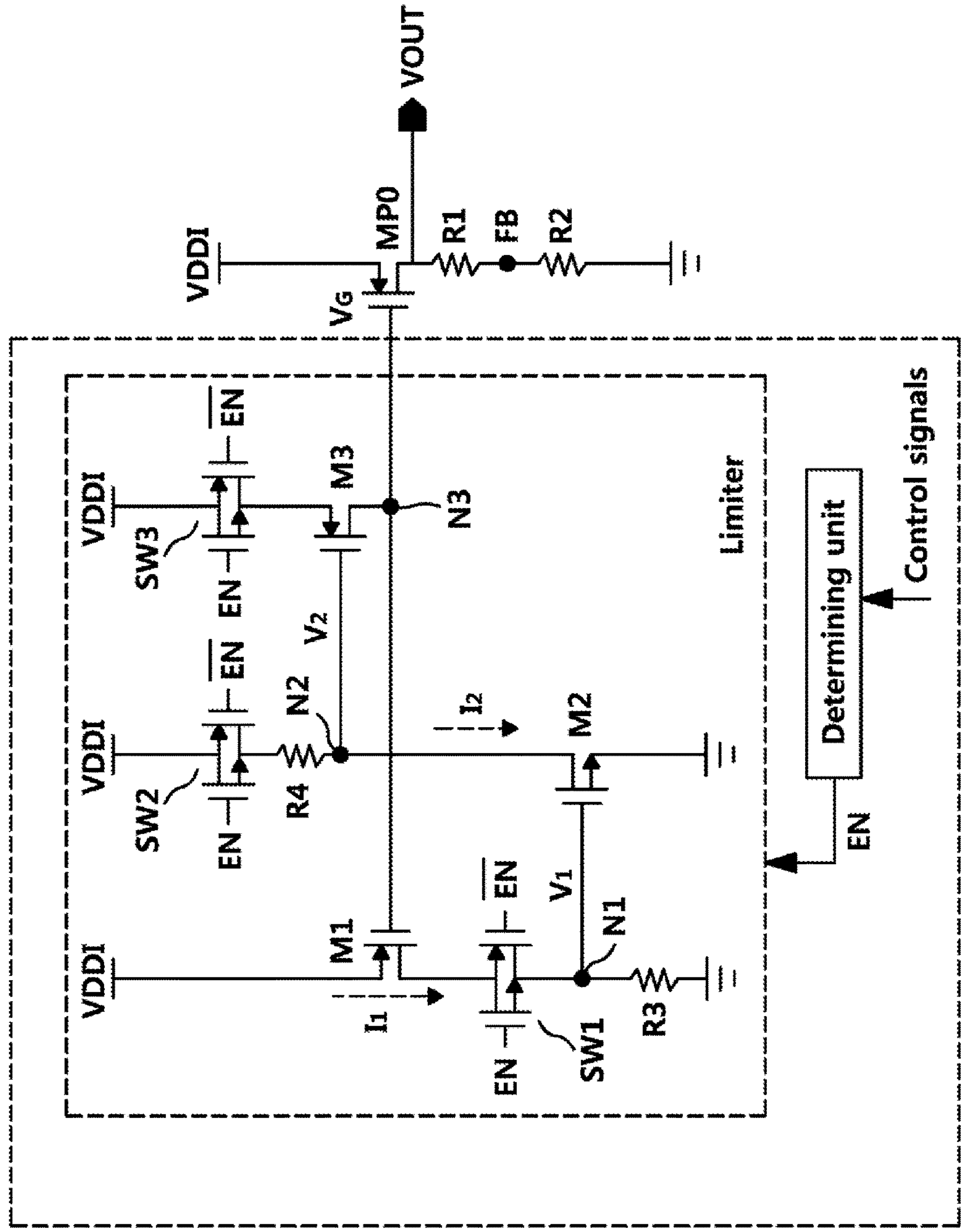
FIG. 3 illustrates a block diagram of the limiter illustrated in FIG. 2.
Figure 7:
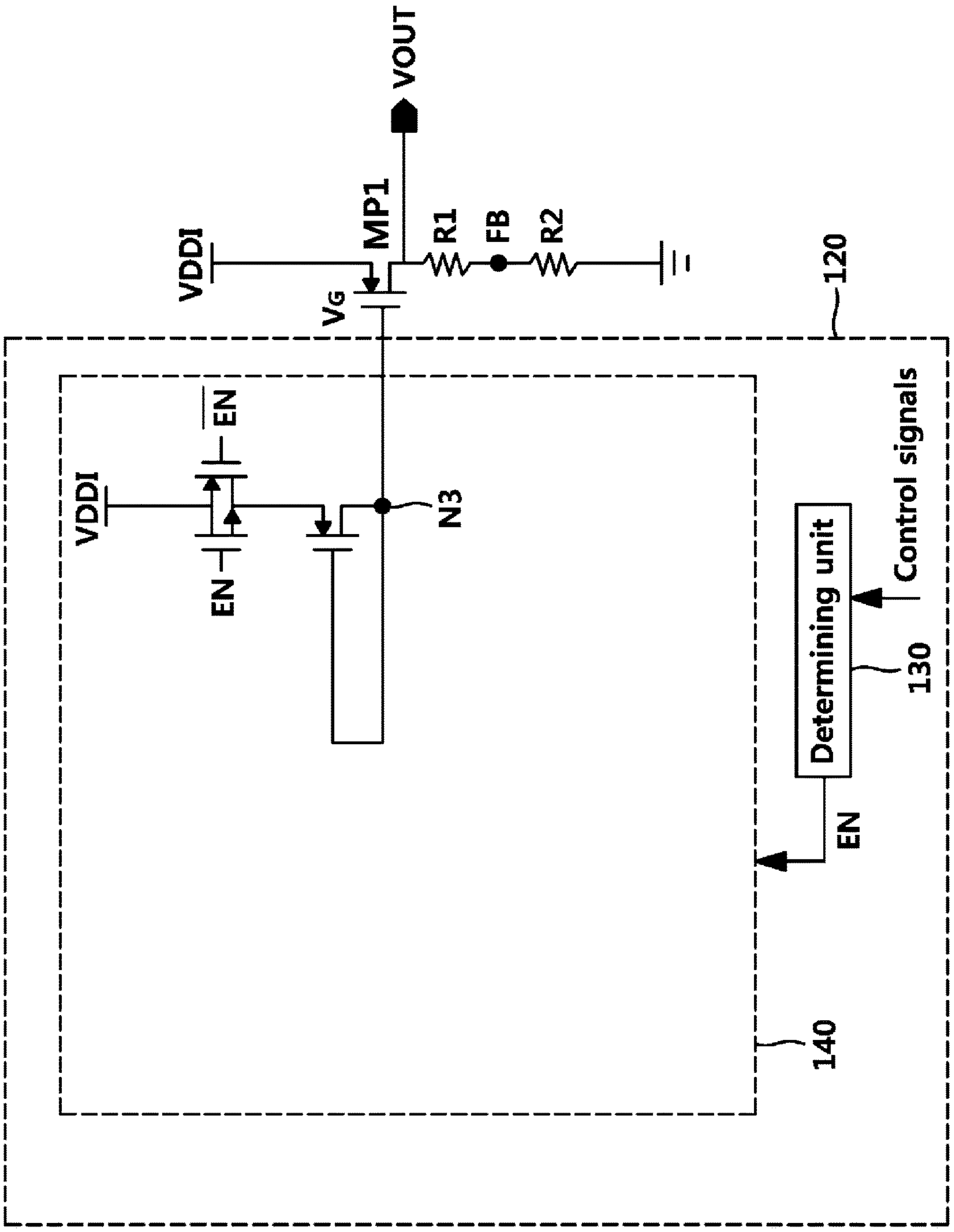
FIG. 7 illustrates a circuit block diagram of a limiter of the disclosure.

FIG. 7 illustrates a circuit block diagram of the limiter according to one or more examples. Comparing FIG. 7 with FIG. 3 illustrating a typical limiter, many circuit elements are eliminated. As shown in FIG. 7, even with a simpler circuit, the inrush current may be prevented during the initial operation period of the LDO regulator.

Comparing FIG. 7 with FIG. 3, a design area becomes smaller than a typical case. For example, the design area of the typical circuit is 80 μm×80 μm. However, by configuring the limiter with only 1 transistor and 1 switch as shown in FIG. 7, the design area may be reduced to 1/20 or less compared to the typical case. Therefore, the entire size of a regulator device may become smaller, and consequently, a device layout of the entire device, including the regulator device, may be placed efficiently.

According to one or more examples, an inrush current of a low voltage drop output regulator may be prevented as the typical case, but a circuit configuration may be simplified. Therefore, a design area of a circuit may be reduced.

While this disclosure includes specific examples, it will be apparent after an understanding of the one or more examples of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A low voltage drop output regulator, comprising:
a differential amplifier configured to output an amplified voltage by comparing a reference voltage with a feedback voltage;
a first MOS transistor configured to output an output voltage to a drain terminal by receiving the amplified voltage in a gate terminal; and
an inrush preventer connected between a power voltage terminal and a drive node, which is an output terminal of the differential amplifier, and configured to prevent an inrush current of the first MOS transistor during an initial operation period,
wherein the inrush preventer comprises a second MOS transistor and a switch connected in series between the power voltage terminal and the drive node, and is connected with the gate terminal of the first MOS transistor,
wherein the differential amplifier comprises a third MOS transistor and a fourth MOS transistor connected in series between the power voltage terminal and a ground terminal,
wherein source and body terminals of the third MOS transistor are connected to the power voltage terminal, source and body terminals of the fourth MOS transistor are connected to the ground terminal, and drain terminals of the third and fourth MOS transistors are connected to the gate terminal of the first MOS transistor,
wherein the inrush preventer is configured to keep a voltage level of the drive node higher than 0V during the initial operation period, and
wherein the second MOS transistor is configured to charge an amount of current flowing through the fourth MOS transistor during the initial operation period.

2. The low voltage drop output regulator of claim 1, wherein the switch is connected between the power voltage terminal and the second MOS transistor.

3. The low voltage drop output regulator of claim 2, wherein the second MOS transistor is connected between the switch and the drive node.

4. The low voltage drop output regulator of claim 1, wherein the second MOS transistor is connected between the power voltage terminal and the switch.

5. The low voltage drop output regulator of claim 4, wherein the switch is connected between the second MOS transistor and the drive node.

6. The low voltage drop output regulator of claim 1, wherein the inrush preventer comprises:
a determining unit configured to output a switch-on signal according to control signals; and
a limiter configured to turn on or off based on the switch-on signal to control the amplified voltage provided to the gate terminal of the first MOS transistor.

7. The low voltage drop output regulator of claim 1, wherein the initial operation period refers to a time from which the switch maintains a turned-on state until it is turned off.

8. The low voltage drop output regulator of claim 1, wherein the first to third MOS transistors are P-type, and the fourth MOS transistor is N-type.

9. The low voltage drop output regulator of claim 1, further comprising:
a plurality of distribution resistors connected between the drain terminal and the ground terminal to generate the feedback voltage; and
an output capacitor connected to the drain terminal, which is an output terminal of the first MOS transistor.

10. A low voltage drop output regulator, comprising:
a differential amplifier configured to output an amplified voltage by comparing a reference voltage with a feedback voltage;
a first MOS transistor connected to an output terminal of the differential amplifier; and
a second MOS transistor and a switch for preventing an inrush current of the first MOS transistor that are connected in parallel to a gate terminal of the first MOS transistor,
wherein a drive node between the output terminal of the differential amplifier and the gate terminal of the first MOS transistor maintains a certain level of voltage while the switch is being turned on,
wherein the differential amplifier comprises a third MOS transistor and a fourth MOS transistor connected in series between a power voltage terminal and a ground terminal,
wherein source and body terminals of the third MOS transistor are connected to the power voltage terminal, source and body terminals of the fourth MOS transistor are connected to the ground terminal, and drain terminals of the third and fourth MOS transistors are connected to the gate terminal of the first MOS transistor,
wherein a distributed voltage divided by the second MOS transistor and the fourth MOS transistor is applied to the drive node in response to the second MOS transistor being turned on, and
wherein the certain level of voltage is a difference between a voltage level of the power voltage terminal and a turned-on voltage of the second MOS transistor.

11. The low voltage drop output regulator of claim 10, wherein the second MOS transistor for preventing the inrush current of the first MOS transistor compensates an amount of current from the power voltage terminal as much as a flowing amount into the ground terminal through the differential amplifier.

12. The low voltage drop output regulator of claim 10, wherein the certain level of voltage is higher than 0V.

13. The low voltage drop output regulator of claim 10, wherein the switch is configured to turn on during an initial operation period of the low voltage drop output regulator, and the switch is configured to turn off in a normal operation of the low voltage drop output regulator.

14. A method for controlling a low voltage drop output regulator, the method comprising:
applying an amplifier (AMP) enable signal for operating a differential amplifier while a switch is being turned on that is connected in series between a power voltage terminal and a drive node connected to a gate terminal of a first MOS transistor;
increasing an output voltage during an initial operation period of the low voltage drop output regulator by the AMP enable signal; and
maintaining a voltage level of the drive node higher than 0V during the initial operation period by a second MOS transistor connected in series to the switch, wherein the differential amplifier comprises a third MOS transistor and a fourth MOS transistor connected in series between the power voltage terminal and a ground terminal, wherein source and body terminals of the third MOS transistors are connected to the power voltage terminal, source and body terminals of the fourth MOS transistor are connected to the ground terminal, and drain terminals of the third and fourth MOS transistors are connected to the gate terminal the first MOS transistor, wherein a distributed voltage divided by the second MOS transistor and the fourth MOS transistor is applied to the drive node in response to the second MOS transistor being turned on, wherein while the switch is being turned on, the fourth MOS transistor decreases a drive voltage of the drive node below a certain voltage, and wherein the certain voltage is a difference between a voltage level of the power voltage terminal and a turned-on voltage of the second MOS transistor.

15. The method for controlling a low voltage drop output regulator of claim 14, wherein the differential amplifier is configured to charge the drive node through the second MOS transistor as much as a flowing amount through the fourth MOS transistor during the initial operation period.

16. The method for controlling a low voltage drop output regulator of claim 15, wherein the initial operation period is completed when the switch is turned off.

* * * * *